(12) United States Patent
Wang et al.

(10) Patent No.: US 11,962,035 B2
(45) Date of Patent: Apr. 16, 2024

(54) PEO FILM, PREPARATION METHOD THEREOF, AND SOLID-STATE BATTERY

(71) Applicant: CALB Technology Co., Ltd., Changzhou (CN)

(72) Inventors: Kangping Wang, Changzhou (CN); Chen Cao, Changzhou (CN); Chao Chen, Changzhou (CN); Xu Li, Changzhou (CN); Yang Li, Changzhou (CN)

(73) Assignee: CALB Technology Co., Ltd., Jiangsu (CN)

( * ) Notice: Subject to any disclaimer, the term of this patent is extended or adjusted under 35 U.S.C. 154(b) by 550 days.

(21) Appl. No.: 17/012,025

(22) Filed: Sep. 3, 2020

(65) Prior Publication Data

US 2021/0301082 A1    Sep. 30, 2021

(30) Foreign Application Priority Data

Mar. 25, 2020   (CN) ......................... 202010217510.X

(51) Int. Cl.
| | |
|---|---|
| *H01M 50/46* | (2021.01) |
| *C08G 65/26* | (2006.01) |
| *H01M 50/411* | (2021.01) |

(52) U.S. Cl.
CPC ........ *H01M 50/46* (2021.01); *C08G 65/2639* (2013.01); *H01M 50/411* (2021.01)

(58) Field of Classification Search
None
See application file for complete search history.

(56) References Cited

U.S. PATENT DOCUMENTS

| | | | | |
|---|---|---|---|---|
| 6,468,696 | B1 * | 10/2002 | Siling ................. | H01M 10/052 |
| | | | | 429/317 |
| 2001/0006988 | A1 | 7/2001 | Kuhnle et al. | |
| 2013/0063092 | A1 * | 3/2013 | Yang ................... | H01M 10/052 |
| | | | | 429/246 |

FOREIGN PATENT DOCUMENTS

| | | |
|---|---|---|
| CN | 1418242 | 5/2003 |
| CN | 102074735 | 5/2011 |
| CN | 109478684 | 3/2019 |
| CN | 109705274 | 5/2019 |

OTHER PUBLICATIONS

Steven E. Bullock et al., "Polymeric Nanoscale All-Solid State Battery", Materials Research Society Symposium Proceedings, Jan. 1, 2001, pp. 1-5.
Heather D. Maynard et al., "Synthesis of Functionalized Polyethers by Ring-Opening Metathesis Polymerization of Unsaturated Crown Ethers", Macromolecules, Sep. 29, 1999, pp. 6917-6924.
F. Alloin et al., "Partial hydrogenation of unsaturated polyethers: A convenient route to curable terpolymers for lithium batteries", Journal of Polymer Science Part A: Polymer Chemistry, Aug. 15, 2000, pp. 2900-2909.
Office Action of China Counterpart Application, with English translation thereof, dated Feb. 1, 2021, pp. 1-14.
"Search Report of Europe Counterpart Application", dated Feb. 4, 2021, p. 1-p. 9.

\* cited by examiner

*Primary Examiner* — Jonathan G Leong
*Assistant Examiner* — Tony S Chuo
(74) *Attorney, Agent, or Firm* — JCIP GLOBAL INC.

(57) ABSTRACT

The disclosure relates to the battery field and a PEO film, a preparation method thereof, and a solid-state battery are provided. A molecular structure of the PEO film includes a structural unit B, and the structural unit B includes —CH═CH—O—.

11 Claims, No Drawings

PEO FILM, PREPARATION METHOD THEREOF, AND SOLID-STATE BATTERY

CROSS-REFERENCE TO RELATED APPLICATION

This application claims the priority benefit of China patent application serial no. 202010217510.X, filed on Mar. 25, 2020. The entirety of the above-mentioned patent application is hereby incorporated by reference herein and made a part of this specification.

BACKGROUND

Technical Field

The disclosure relates to the technical field of batteries, and in particular, to a PEO film, a preparation method thereof, and a solid-state battery.

Description of Related Art

As the popularity of portable electronic apparatuses, wearable electronic apparatuses, and environmentally-friendly green electric vehicle grows, the demands for the research and development of flexible, highly-secure, highly-reliable, and highly-powerful apparatuses are on the rise.

In a solid-state battery, since a solid-state battery uses the solid polymer electrolyte instead of the traditional liquid electrolyte, safety issues such as liquid leakage and combustion explosion are prevented. In a solid-state battery, the polymer electrolyte is a polymer multiphase composite material in the form of a solid ion conductor and may be as both a separator and an electrolyte.

The PEO-based electrolyte film features advantages such as good lithium ion transmission performance, ease of processing, and good thermoplasticity, so that such electrolyte film is widely used at present. Nevertheless, a PEO separator is suitable for working at a temperature of 70-80° C., and the lithium ion conduction rate at room temperature (25° C.) may be greatly reduced.

SUMMARY

The disclosure provides a PEO film, a preparation method thereof, and a solid-state battery.

The disclosure provides a PEO film. A molecular structure of the PEO film includes a structural unit B, and the structural unit B includes —CH=CH—O—.

The disclosure further provides a preparation method of a PEO film, and the preparation method includes the following steps.

A copolymerization reaction of an ethylene oxide monomer and an F-containing cyclic ether monomer is performed to obtain a polymer precursor containing a structural unit D, where the structural unit D includes —$C_2H_3F$—O—.

Polymer glue containing the structural unit B is obtained after a F removal treatment is performed on the polymer precursor, and a film forming treatment is performed on the polymer glue to obtain the PEO film, where the structural unit B includes —CH=CH—O—.

The disclosure further provides a solid-state battery including an anode electrode sheet, a cathode electrode sheet, and the PEO film provided by the disclosure or the PEO film obtained through the preparation method provided by the disclosure between the anode electrode sheet and the cathode electrode sheet.

DESCRIPTION OF THE EMBODIMENTS

The accompanying drawings in the embodiments of the disclosure are included to provide a clear and complete description of the technical solutions provided in the embodiments of the disclosure. Obviously, the described embodiments are merely part of the embodiments, rather than all of the embodiments, of the disclosure. Based on the embodiments of the disclosure, all other embodiments obtained by a person of ordinary skill in the art without making any inventive effort fall within the scope that the disclosure seeks to protect.

Note that in the disclosure, unless otherwise specified, all embodiments and preferred embodiments provided in the specification may be combined with each other to form new technical solutions. In the disclosure, unless otherwise specified, all technical features and preferred technical features provided in the specification may be combined with each other to form new technical solutions. In the disclosure, unless otherwise specified, percentage (%) or part refers to the weight percentage or part by weight relative to the composition. In the disclosure, unless otherwise specified, the involved components or preferred components may be combined with each other to form new technical solutions. In the disclosure, unless otherwise specified, the numerical range "a-b" represents an abbreviated representation of any combination of real numbers between a and b, where a and b are both real numbers. For instance, the numerical range "6-22" means that all real numbers between "6 and 22" have been listed in the specification, and "6-22" is just an abbreviated representation of these numerical combinations. In the disclosure, the disclosed "range" in the form of a lower limit and an upper limit may respectively be one or plural lower limits and one or plural upper limits. In the disclosure, unless otherwise specified, the reaction or operation steps may be performed sequentially or in order. Preferably, the reaction methods in the specification are performed sequentially.

Unless otherwise specified, the technical and scientific terms used in the specification have the same meaning as those familiar to a person of ordinary skill in the art. In addition, any method or material similar or equivalent to the described content may also be applied to the disclosure.

The existing solution is to add lithium ion conductor powder to PEO, the commonly used lithium ion conductor powders are all solid phases, so that problems regarding contact between PEO with anode and cathode and stability of PEO are found. Although the existing solution may solve the problem of poor conductivity of PEO at room temperature to a certain extent, contact performance of the electrolyte film and anode and cathode and stability of the electrolyte film itself are affected. Cyclic stability of a battery is thereby affected.

A main chain structure of polyoxyethylene PEO contains a structural unit A, where a structure of the structural unit A is shown as follows:

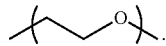

In the structural formula, a strong electron donating group-ether oxygen functional group is included. In a complex system formed by an ether oxygen functional group and an alkali metal (e.g., Li), PEO acts as an ion conducting matrix, and metal ions (e.g., Li+) as an electric charge carrier source.

Under the action of ether oxygen atoms, metal salt dissociates into electric charge carriers. Metal ions migrate through the ongoing complexation/decomplexation process with ether oxygen atoms, and in this way, transmission of metal ions is achieved. Nevertheless, a PEO electrolyte film has poor conductivity at room temperature, and stability of the PEO electrolyte film itself is affected after solid conductive powder is added. As such, further applications of the PEO electrolyte film are limited.

Accordingly, the disclosure provides a PEO film. A molecular structure of the PEO film includes a structural unit B, and the structural unit B includes —CH═CH—O—.

In the PEO film provided by the disclosure, the structural unit B including the —CH═CH—O— is formed in the molecular structure of the PEO film, and an oxygen atom adjacent to the olefinic bond in the structural unit B has a lone pair of electrons. Compared to saturated hydrocarbons, the structural unit B is thus more inclined to transfer electrons to double bonds to increase electron cloud density of the double bonds, so that the double bonds are more suitable for combining with Li+. In this way, the transmission capability of lithium ions is further improved. The PEO film provided by the disclosure is modified from the PEO film itself, rather than being added with an added additional solid phase structure of lithium ion conductor powder. Therefore, the PEO film provided by the disclosure may be securely adhered to an anode and a cathode and may continuously contact with the anode and the cathode securely after being assembled into a battery, and detachment is thereby prevented. Further, since solid powder is not added to the PEO film provided by the disclosure, the PEO film itself is an integral structure and exhibits a high degree of structural compactness. Therefore, the PEO film provides good stability. Accordingly, in the case that conductivity of the PEO film provided by the disclosure is effectively improved, good structural stability of the PEO film provided by the disclosure is maintained.

Through using the PEO film, the problems of poor conductivity, poor contact performance with anode and cathode and poor stability found in an existing PEO film may thus be solved. In this way, conductivity of the PEO film is increased and stability of the PEO film itself is enhanced.

In an exemplary embodiment of the disclosure, the structural unit B is —CH═CH—O— or —R$_1$—CH═CH—O—, where R$_1$ is selected from a C1 to C10 linear alkyl group or a C2 to C10 linear alkenyl group.

Herein, R$_1$ is selected from a C1 to C10 linear alkyl group or a C2 to C10 linear alkenyl group, such as —CH$_2$—, —CH$_2$—CH$_2$—, —CH$_2$—CH$_2$—CH$_2$—, —CH═CH—, —CH$_2$—CH═CH—, or —CH═CH—CH═CH— and the like. In an exemplary embodiment of the disclosure, R$_1$ is —(CH═CH)$_n$—, and n is an integer selected from 1-5. At this time, the structural unit B is —(CH═CH)$_n$—CH═CH—O—. When R is defined to be the structure, increasing carbon-carbon double bonds may be obtained. In the case that a complexation reaction of the PEO itself is effectively ensured, the electron cloud density in a molecular chain increases, so that the transmission capability of the lithium ions is improved.

In the disclosure, a mass ratio of the structural unit B may be, for example, 5% to 50%.

In some embodiments of the disclosure, the structural unit B is one of the following structural formulas B1, B2, or B3:

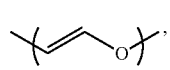

B1

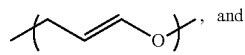

B2

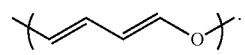

B3

The structural unit B may thus be easily formed, and a generation reaction thereof may be easily controlled.

In some embodiments of the disclosure, the molecular structure of the PEO film includes a structural unit D, and the structural unit D contains —C$_2$H$_3$F—O—.

In the structural unit D, since F exhibits a strong electron-withdrawing property, F may form a strong hydrogen bond with PVDF, SBR, and other materials in an anode electrode sheet and a cathode electrode sheet and may bond with active substance surfaces in the anode electrode sheet and the cathode electrode sheet. Therefore, through the generation of the structural unit D, adhesion between the PEO film and the anode electrode sheet and the cathode electrode sheet may be improved. In this way, interface contact impedance between the electrolyte film and the electrode sheets is reduced, and electrical performance of the battery is further improved.

In an exemplary embodiment, the structural unit D is —C$_2$H$_3$F—O— or —R$_2$—C$_2$H$_3$F—O—, where R$_2$ is selected from a C1 to C10 linear alkyl group, and the linear alkyl group may be a linear alkyl group substituted with F.

The structural unit D may be, for example, —CH$_2$CHF—O— or —CHFCH$_2$—O— and may also be —R$_2$—CH$_2$CHF—O— or —R$_2$—CHFCH$_2$—O—. Herein, in the structural unit D, at most one F substituent is provided on any two adjacent carbon atoms, so that a carbon-carbon double bond is formed after F is removed.

In the disclosure, a mass ratio of the structural unit D may be, for example, 5% to 25%.

In some embodiments of the disclosure, the structural unit D is one of the following structural formulas D1, D2, or D3:

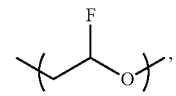

D1

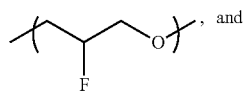

D2

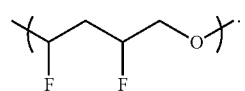

D3

The structural unit D may thus be easily formed, and a generation reaction thereof may be easily controlled.

Based on the same inventive concept, the disclosure provides a preparation method of a PEO film, and the preparation method includes the following steps.

A copolymerization reaction of an ethylene oxide monomer and an F-containing cyclic ether monomer is performed to obtain a polymer precursor containing a structural unit D, where the structural unit D includes —C$_2$H$_3$F—O—.

A F removal treatment is performed on the polymer precursor to form polymer glue containing a structural unit B, and a film forming treatment is performed on the polymer glue to obtain the PEO film, where the structural unit B includes —CH=CH—O—.

In the PEO film obtained through the preparation method provided by the disclosure, the structural unit B containing —CH=CH—O— is formed in the finally prepared PEO film. In the structural unit B, an oxygen atom adjacent to the olefinic bond has a lone pair of electrons. Compared to saturated hydrocarbons, the structural unit B is thus more inclined to transfer electrons to double bonds to increase electron cloud density of the double bonds, so that the double bonds are more suitable for combining with Li+. In this way, the transmission capability of lithium ions is further improved. The PEO film obtained through the preparation method provided by the disclosure is modified from the PEO film itself, rather than being added with an added additional solid phase structure of lithium ion conductor powder. Therefore, the PEO film obtained through the preparation method provided by the disclosure may be securely adhered to an anode and a cathode and may continuously contact with the anode and the cathode securely after being assembled into a battery, and detachment is thereby prevented. Further, since solid powder is not added to the PEO film obtained through the preparation method, the PEO film itself is an integral structure and exhibits a high degree of structural compactness. Therefore, the PEO film provides good stability. Accordingly, in the case that conductivity of the PEO film obtained through the preparation method provided by the disclosure is effectively improved, good structural stability of the PEO film obtained through the preparation method provided by the disclosure is maintained.

In an exemplary embodiment, the structural unit D is —$C_2H_3F$—O— or —$R_2$—$C_2H_3F$—O—, where $R_2$ is selected from a C1 to C10 linear alkyl group, and the linear alkyl group may be a linear alkyl group substituted with F.

The structural unit B is —CH=CH—O— or —$R_1$—CH=CH—O—, where $R_1$ is selected from a C1 to C10 linear alkyl group or a C2 to C10 linear alkenyl group.

The structural unit D may be, for example, —$CH_2$CHF—O— or —CHFCH$_2$—O— and may also be —$R_2$—CH$_2$CHF—O— or —$R_2$—CHFCH$_2$—O—. Herein, in the structural unit D, at most one F substituent is provided on any two adjacent carbon atoms, so that a carbon-carbon double bond is formed after F is removed.

Herein, $R_1$ is selected from a C1 to C10 linear alkyl group or a C2 to C10 linear alkenyl group, such as —$CH_2$—, —$CH_2$—$CH_2$—, —$CH_2$—$CH_2$—$CH_2$—, —CH=CH—, —$CH_2$—CH=CH—, or —CH=CH—CH=CH— and the like. In an exemplary embodiment, $R_1$ is —(CH=CH)$_n$—, and n is an integer selected from 1-5. At this time, the structural unit B is —(CH=CH)$_n$—CH=CH—O—. When R is defined to be the structure, increasing carbon-carbon double bonds may be obtained. In the case that a complexation reaction of the PEO itself is effectively ensured, the electron cloud density in a molecular chain increases, so that the transmission capability of the lithium ions is improved.

In some embodiments of the disclosure, the preparation method of the PEO film provided by the disclosure includes the following steps.

A copolymerization reaction of an ethylene oxide monomer and an F-containing cyclic ether monomer is performed to obtain a polymer precursor containing a structural unit A and a structural unit D, where a structural formula of the structural unit A is

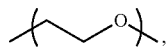

and the structural unit D is —$C_2H_3F$—O— or —$R_2$—$C_2H_3F$—O—. Herein, $R_2$ is selected from a C1 to C10 linear alkyl group, and the linear alkyl group may be a linear alkyl group substituted with F.

A F removal treatment is performed on the polymer precursor to form polymer glue containing the structural unit A and the structural unit B. A film forming treatment is performed on the polymer glue to obtain the PEO film, where the structural unit B is —CH=CH—O— or —$R_1$—CH=CH—O—, and $R_1$ is selected from a C1 to C10 linear alkyl group or a C2 to C10 linear alkenyl group.

In the preparation method of the PEO film provided by the embodiment, when an ethylene oxide monomer reacts with an F-containing cyclic ether monomer, a polymer precursor containing the structural unit A and the structural unit D is obtained. Herein, a structural formula of the structural unit A is

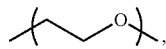

and a structural formula of the structural unit D is —$C_2H_3F$—O— or —$R_2$—$C_2H_3F$—O—. Polymer glue containing the structural unit A and the structural unit B is obtained after a F removal treatment is performed on the polymer precursor, and a film forming treatment is performed on the polymer glue to obtain the PEO film.

Note that the structure of the PEO film obtained through the preparation method provided by the disclosure includes the structural unit A and the structural unit B and may selectively include the structural unit D according to the F removal condition.

When a complete F removal treatment is performed, the obtained PEO film does not include the structural unit D, but when an incomplete F removal treatment is performed, the obtained PEO includes the structural unit D. When the structural unit D is included, since F included in the structural unit D exhibits a strong electron-withdrawing property, F may form a strong hydrogen bond with PVDF, SBR, and other materials in an anode electrode sheet and a cathode electrode sheet and may bond with active substance surfaces in the anode electrode sheet and the cathode electrode sheet. Therefore, through the generation of the structural unit D, adhesion between the PEO film and the anode electrode sheet and the cathode electrode sheet may be improved. In this way, interface contact impedance between the electrolyte film and the electrode sheets is reduced, and electrical performance of the battery is further improved.

Herein, the F-containing cyclic ether is a cyclic ether in which part of hydrogens is substituted with F in the cyclic ether. For instance, the F-containing cyclic ether includes but is not limited to at least one of the following structures:

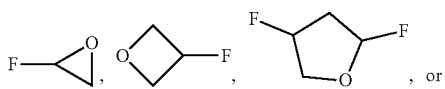

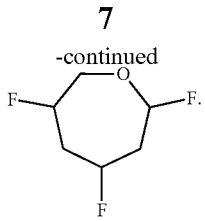

The above F-containing cyclic ether is a saturated cyclic ether that may be subjected to ring-opening easily, and fluorine atoms are provided on the carbon chain. Since structures of this type of monomers and ethylene oxide monomers are similar, the two type of monomers may be uniformly arranged during polymerization, so that a structure in which the two types of monomers are separated from each other may not be easily generated.

Besides, in the disclosure, a mass ratio of the ethylene oxide monomer to the F-containing cyclic ether monomer may be, for example, 19 to 1:1. When the mass ratio of the ethylene oxide monomer to the F-containing cyclic ether monomer is defined, the proportion of the structural unit B obtained in the PEO film may be further optimized. In this way, the proportion of the structural unit B is controlled within a reasonable range, and on the premise of conductivity improvement of the PEO film, the separator function of the PEO film is maintained at the same time.

In some embodiments of the disclosure, an ethylene oxide monomer and an F-containing cyclic ether monomer are evenly stirred in an aprotic solvent, and fluoride ions act as a catalyst for reaction to obtain the polymer precursor.

Herein, the aprotic solvent includes but is not limited to at least one of liquid ammonia, liquid chlorine, or ether. The ether is aliphatic polyether having 4 to 15 carbon atoms and includes but is not limited to at least one of ethylene glycol dimethyl ether, diethylene glycol dimethyl ether, triethylene glycol dimethyl ether, acetonitrile, propionitrile, tetraethanol glycol dimethyl ether, or bis[2-(2-methoxyethoxy)ethyl] ether.

In some embodiments of the disclosure, the prepared polymer precursor is dispersed in an organic solvent for a F removal treatment, and polymer glue is formed. The polymer glue is then coated on a base film, and the PEO film is obtained after drying.

Herein, the organic solvent includes but is not limited to at least one of NMP, acetonitrile, EMC, or DMF.

In some embodiments of the disclosure, the preparation method of the PEO film includes the following steps.

In step S1, an ethylene oxide monomer and an F-containing cyclic ether monomer with a mass ratio of 19:1 to 1:1 are evenly stirred at −60° C. to 25° C. in an aprotic solvent, fluoride ions (KF, CsF/LiCl, LiBr) act as a catalyst for reaction for 3 to 24 hours, and a polymer precursor is obtained after filtration.

In the reaction process, after the ethylene oxide monomer reacts with the F-containing cyclic ether monomer, the polymer precursor containing the structural unit A and the structural unit D is obtained.

In step S2, the prepared polymer precursor is dispersed in an organic solvent (e.g., NMP, acetonitrile, EMC, or DMF) to prepare polymer glue, nitrogen or clean air with a water content of 40-500 ppm is introduced, stirring is performed for 10-200 minutes, and the polymer glue is obtained.

In the process, a F removal treatment is performed on the structural unit D, so that part or all of the structural unit D is transformed into the structural unit B.

In step S3, the polymer glue obtained in step S2 is then coated on a base film, and the PEO film is obtained after drying.

In the embodiments of the disclosure, a Lewis base is formed in the polymer glue through introduction of air containing water, so that the F removal treatment is achieved. It may be understood that, in addition to the above manner, other Lewis bases may also be added to achieve F removal. In this embodiment, no other substances are included in the Lewis base obtained through addition of a water-containing gas, so that purity of the obtained polymer glue is effectively ensured.

Taking an NMP organic solvent as an example, during the process of removing F from the structural unit D to form a carbon-carbon double bond, such process may also be carried out by the free ammonia formed after NMP is provided with water. The reaction conditions of F removal are mild, and the generation amount may be controlled.

In addition, in step S2, at least one of lithium lanthanum zirconium oxide (LLZO), lithium aluminum germanium phosphate (LAGP), or lithium lanthanum zirconium tantalum oxide (LLZTO) may be selectively added to the organic solvent to obtain a dispersed alkaline electrolyte suspension. Through addition of the alkaline substance, the concentration of the Lewis base is increased, and conductivity of the PEO film is also improved.

In the preparation method provided by the embodiments of the disclosure, a copolymerization method is adopted, so that crystallinity of PEO is reduced. After F is removed from the polymer precursor, a carbon-carbon double bond may be generated, the delocalized electron cloud of the carbon-carbon double bond has a certain binding capacity with lithium ions, so that the transportation capability of the lithium ions is further enhanced. The above F-containing cyclic ether introduced in the synthesis process is a saturated cyclic ether that may be subjected to ring-opening easily, and fluorine atoms are provided on the carbon chain. Since structures of this type of monomers and ethylene oxide monomers are similar, the monomers may be uniformly arranged during polymerization, so that a structure in which the two types of monomers are separated from each other may not be easily generated, and stability of the PEO film is improved. And, bonding force between the PEO film and the electrode sheets is improved through the structural unit without F removal, and contact impedance is lowered, so an integrated medium is thus provided.

In another aspect, the disclosure provides a solid-state battery including an anode electrode sheet, a cathode electrode sheet, and the PEO film provided by the disclosure or a PEO film obtained through the preparation method provided by the disclosure between the anode electrode sheet and the cathode electrode sheet.

Herein, the cathode electrode sheet may include, for example, a cathode current collector and a cathode material layer. The cathode material layer includes a cathode active material, an adhesive, and a conductive agent. The cathode active material may be selected from, for example, lithium iron phosphate, lithium nickel manganese cobalt oxide, or lithium nickel manganese aluminate and the like. The anode electrode sheet includes, for example, an anode current collector and an anode material layer. The anode material layer includes an anode active material, an adhesive, and a conductive agent.

The solid-state battery provided by the disclosure has high electrical performance and also high cyclic stability.

The following examples are included to provide a detailed understanding of the disclosure.

Example 1

The disclosure relates to a PEO electrolyte film, which is obtained through the following method.

In step S1, an ethylene oxide monomer and an F-containing cyclic ether monomer

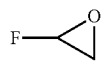

with a mass ratio of 19:1 are evenly stirred at a room temperature of 25° C.±5° C. in an aprotic solvent of ethylene glycol dimethyl ether, fluoride ions (KF/LiCl) act as a catalyst for reaction for 15 hours, and a polymer precursor is obtained after filtration.

In the reaction process, the polymer precursor generated after the ethylene oxide monomer reacts with the F-containing cyclic ether monomer

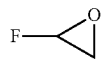

includes a main chain structure containing a structural unit A

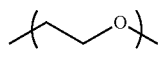

and a structural unit D1

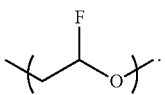

In step S2, the prepared polymer precursor is dispersed in an NMP organic solvent to prepare polymer glue, nitrogen or clean air with a water content of 200 ppm is introduced, stirring is performed for 60 minutes, and the polymer glue is obtained.

In the process, a F removal treatment is performed on the structural unit D1

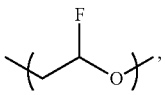

so that part of the structural unit D1 is transformed into a structural unit B1

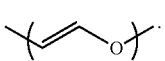

In step S3, the polymer glue obtained in step S2 is then coated on a PE base film, and the PEO film is obtained after drying.

After being tested through a viscosity method, the weight-average molecular weight of the obtained PEO is $2.14 \times 10^5$.

Example 2

The disclosure relates to a PEO electrolyte film, which is obtained through the following method.

In step S1, an ethylene oxide monomer and an F-containing cyclic ether monomer

with a mass ratio of 19:1 are evenly stirred at a room temperature of 25° C.±5° C. in an aprotic solvent of ethylene glycol dimethyl ether, fluoride ions (KF/LiCl) act as a catalyst for reaction for 15 hours, and a polymer precursor is obtained after filtration.

In the reaction process, after the ethylene oxide monomer reacts with the F-containing cyclic ether monomer, the polymer precursor containing a structural unit A and a structural unit D2 is obtained.

In step S2, the prepared polymer precursor is dispersed in an NMP organic solvent to prepare polymer glue, nitrogen or clean air with a water content of 200 ppm is introduced, stirring is performed for 60 minutes, and the polymer glue is obtained.

In the process, a F removal treatment is performed on the structural unit D2, so that part of the structural unit D2 is transformed into a structural unit B2

In step S3, the polymer glue obtained in step S2 is then coated on a PE base film, and the PEO film is obtained after drying.

After being tested through a viscosity method, the weight-average molecular weight of the obtained PEO is $1.96 \times 10^5$.

Example 3

The disclosure relates to a PEO electrolyte film, which is obtained through the following method.

In step S1, an ethylene oxide monomer and an F-containing cyclic ether monomer

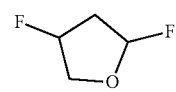

with a mass ratio of 19:1 are evenly stirred at a room temperature of 25° C. 5° C. in an aprotic solvent of ethylene glycol dimethyl ether, fluoride ions (KF/LiCl) act as a catalyst for reaction for 15 hours, and a polymer precursor is obtained after filtration.

In the reaction process, after the ethylene oxide monomer reacts with the F-containing cyclic ether monomer, the polymer precursor containing a structural unit A

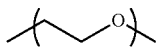

and a structural unit D3

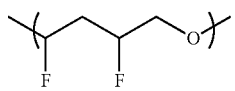

is obtained.

In step S2, the prepared polymer precursor is dispersed in an NMP organic solvent to prepare polymer glue, nitrogen or clean air with a water content of 200 ppm is introduced, stirring is performed for 100 minutes, and the polymer glue is obtained.

In the process, a F removal treatment is performed on the structural unit D3, so that part of the structural unit D3 is transformed into a structural unit B3

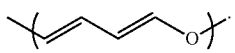

In step S3, the polymer glue obtained in step S2 is then coated on a PE base film, and the PEO film is obtained after drying.

After being tested through a viscosity method, the weight-average molecular weight of the obtained PEO is $1.84 \times 10^5$.

Example 4 to Example 12

Each of the Examples 4 to 6 provides a PEO electrolyte film, and a difference between these Examples and Example 1 is that the mass ratios of the ethylene oxide monomer to the F-containing cyclic ether monomer

are respectively 9:1, 4:1, and 1:1.

Each of the Examples 7 to 9 provides a PEO electrolyte film, and a difference between these Examples and Example 1 is that the aprotic solvents respectively are liquid ammonia, liquid chlorine, and diethylene glycol dimethyl ether.

Each of the Examples 10 to 12 provides a PEO electrolyte film, and a difference between these Examples and Example 1 is that the organic solvents used for preparing the polymer glue respectively are acetonitrile, EMC, and DMF.

Comparative Example 1

The comparative example relates to a PEO electrolyte film, and the preparation process of the electrolyte film includes the following.

In step S1, 1.6 g of $2.0 \times 10^5$ (MW) PEO is added to 12 ml of acetonitrile, and is stirred until dissolved to form transparent glue.

In step S2, the glue is coated on two surfaces of a PE base film for drying, and the PEO electrolyte film is obtained.

Comparative Example 2

The comparative example relates to a PEO electrolyte film, and the electrolyte film includes a film layer and lithium ion conductor powder disposed on the film layer.

A process flow of manufacturing the PEO electrolyte film includes the following.

In step S1, 1.6 g of $2.0 \times 10^5$ (MW) PEO is added to 12 ml of acetonitrile and stirred until dissolved, and the obtained solution is then added with 0.2 g of LiTFSI until dissolved to form transparent glue.

In step S2, 0.2 g of LLZTO is ultrasonically dispersed in 2 ml of acetonitrile for 30 minutes, is then added to the glue, and is stirred for dispersion for 20 minutes.

In step S3, the glue is coated on two surfaces of a PE base film for drying, and the PEO electrolyte film is obtained.

Comparative Example 3

The comparative example relates to a PEO electrolyte film, and the PEO film includes a structural unit E of —CH═CH—CH₂—O—. A preparation method of the PEO film includes the following steps.

In step S1, an ethylene oxide monomer and an F-containing cyclic ether monomer

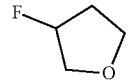

with a mass ratio of 19:1 are evenly stirred at a room temperature of 25° C.±5° C. in an aprotic solvent of ethylene glycol dimethyl ether, fluoride ions (KF/LiCl) act as a catalyst for reaction for 15 hours, and a polymer precursor is obtained after filtration.

In the reaction process, after the ethylene oxide monomer reacts with the F-containing cyclic ether monomer, the polymer precursor containing a structural unit A

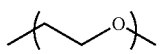

and a structural unit E'

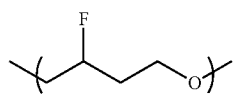

is obtained.

In step S2, the prepared polymer precursor is dispersed in an acetonitrile organic solvent to prepare polymer glue, nitrogen or clean air with a water content of 200 ppm is introduced, stirring is performed for 100 minutes, and the polymer glue is obtained.

In the process, a F removal treatment is performed on a structural unit E', so that part of the structural unit E' is transformed into a structural unit E

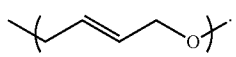

In step S3, the polymer glue obtained in step S2 is then coated on a PE base film, and the PEO film is obtained after drying.

After being tested through a viscosity method, the weight-average molecular weight of the obtained PEO is $1.82 \times 10^5$.

The PEO electrolyte films provided by Examples 1-12 and Comparative Examples 1-3 are respectively tested for HNMR (the solvent is deuterated DMSO), and the following are found.

1) In Examples 1-12, a combination of a single peak and a plurality of split small peaks appears at both 6=5.36 ppm and 6=5.77 ppm, it is thus indicated that the structural unit B is present.
2) In Comparative Example 3, double peaks appear at 6=3.55 ppm, and triple peaks appear at 6=5.88 ppm, and an area ratio of the two is 2:1, it is thus indicated that the structural unit E is present.
3) The above peaks do not appear in Comparative Examples 1 and 2, it is thus indicated that the structural unit B and the structural unit E are not present.

The PEO electrolyte films provided by Examples 1-12 and Comparative Examples 1-3 are respectively tested for film thicknesses and conductivity, and the test results are shown in Table 1. Herein, the film thickness test method includes the following steps. Each of the PEO electrolyte films provided by Examples 1-12 and the Comparative Examples 1-3 is placed in a thin-film thickness gauge for thickness measurement, the measurement is repeated for three times, and the measurement results are averaged to obtain the membrane thickness.

The conductivity test method includes the following steps.
1. The PEO electrolyte films provided by Examples 1-12 and Comparative Examples 1-3 are cut into discs each with a diameter of 1 cm.
2. A Li sheet with a diameter of 1 cm is used, and a symmetric button cell battery is formed according to Li|electrolyte film|Li.
3. The impedance R for each of the button cell batteries is tested through EIS.
4. The conductivity 8 is calculated and obtained, and the calculation formula is: $\delta = d/(R \times S)$.

Herein, d is the thickness of the electrolyte film, R is the impedance at the intercept of the Z-axis high frequency region in EIS, and S is the contact area of the electrolyte film.

TABLE 1

| Serial Number | Molecular Weight | Film Thickness d/μm | Conductivity S/cm (10° C.) | Conductivity S/cm (45° C.) |
|---|---|---|---|---|
| Example 1 | $2.14 \times 10^5$ | 84 | $4.74 \times 10^{-5}$ | $2.96 \times 10^{-4}$ |
| Example 2 | $1.96 \times 10^5$ | 85 | $4.64 \times 10^{-5}$ | $2.63 \times 10^{-4}$ |
| Example 3 | $1.84 \times 10^5$ | 82 | $4.53 \times 10^{-5}$ | $2.32 \times 10^{-4}$ |
| Example 4 | $1.85 \times 10^5$ | 85 | $4.56 \times 10^{-5}$ | $2.35 \times 10^{-4}$ |
| Example 5 | $1.52 \times 10^5$ | 82 | $4.43 \times 10^{-5}$ | $2.28 \times 10^{-4}$ |
| Example 6 | $1.24 \times 10^5$ | 81 | $4.38 \times 10^{-5}$ | $2.27 \times 10^{-4}$ |
| Example 7 | $2.02 \times 10^5$ | 85 | $4.73 \times 10^{-5}$ | $2.94 \times 10^{-4}$ |
| Example 8 | $2.11 \times 10^5$ | 87 | $4.78 \times 10^{-5}$ | $2.79 \times 10^{-4}$ |
| Example 9 | $2.09 \times 10^5$ | 81 | $4.79 \times 10^{-5}$ | $2.88 \times 10^{-4}$ |
| Example 10 | $2.05 \times 10^5$ | 79 | $4.81 \times 10^{-5}$ | $2.81 \times 10^{-4}$ |
| Example 11 | $2.13 \times 10^5$ | 80 | $4.69 \times 10^{-5}$ | $2.73 \times 10^{-4}$ |
| Example 12 | $2.01 \times 10^5$ | 82 | $4.92 \times 10^{-5}$ | $2.90 \times 10^{-4}$ |
| Comparative Example 1 | $2.0 \times 10^5$ | 85 | $0.26 \times 10^{-5}$ | $1.21 \times 10^{-4}$ |
| Comparative Example 2 | $2.0 \times 10^5$ | 85 | $3.07 \times 10^{-5}$ | $2.82 \times 10^{-4}$ |
| Comparative Example 3 | $1.82 \times 10^5$ | 86 | $0.66 \times 10^{-5}$ | $1.45 \times 10^{-4}$ |

Based on the data provided in Table 1, it can be seen in Examples 1-12, Comparative Example 1, and Comparative Example 3 that compared to the PEO film without the structural unit B and the PEO film containing the structural unit E, the PEO film containing the structural unit B exhibits significantly improved conductivity at the low temperature of 10° C. and the high temperature of 45° C. It is thus indicated that an oxygen atom adjacent to olefinic bond in the structural unit B has a lone pair of electrons. Compared to saturated hydrocarbons, the structural unit B is thus more inclined to transfer electrons to double bonds to increase electron cloud density of the double bonds, so that the double bonds are more suitable for combining with Li+. In this way, the transmission capability of lithium ions is further improved. Based on Examples 1-12 and Comparative Example 2, it can be known that the conductivity of the PEO film containing the structural unit B and the conductivity of the PEO film added with the lithium ion conductor powder at the high temperature of 45° C. are comparable. Nevertheless, the PEO film containing the structural unit B exhibits significantly better conductivity at the low temperature of 10° C.

Preparation of a lithium ion battery includes the following steps.

1. Production of Anode Electrode Sheet

A binder PVDF (i.e., polyvinylidene fluoride) is dissolved in non-aqueous solvent NMP (i.e., N-methylpyrrolidone), an anode active material artificial graphite and a conductive agent (which may include: KS-6 and SP) are then added, mixing is fully performed, and a slurry is produced. The composition of the slurry is: artificial graphite:KS-6:SP:PVDF=91:0.5:3.5:solvent 5. Next, the obtained slurry is evenly coated on a 20 μm copper foil, is baked and dried at 120° C., and is rolled, so that an anode electrode sheet is then obtained.

2. Production of Cathode Electrode Sheet

A binder PVDF is dissolved in non-aqueous solvent NMP, a cathode active material NCM (i.e., a ternary cathode material (e.g., $LiNi_{0.5}Co_{0.2}Mn_{0.3}O_2$)) and a conductive agent acetylene black are then added, mixing is fully performed, and a slurry is produced. The composition of the slurry is: $LiNi_{0.5}Co_2Mn_{0.3}O_2$:acetylene black:PVDF=91:5:4. Next, the obtained slurry is evenly coated on aluminum foil, the areal density is 170 g/m², and then the slurry is baked and dried at 120° C. and is rolled, so that a cathode electrode sheet is then obtained.

3. Battery Assembly

The PEO electrolyte films provided by Examples 1-12 and Comparative Examples 1-3 are respectively placed in the anode electrode sheet and the cathode electrode sheet to be assembled into monolithic batteries with a design capacity of 70 mAh, and these batteries are respectively denoted as M1 to M12 and N1 to N3.

The batteries M1 to M12 and the batteries N1 to N3 are left to stand for 12 hours at 45° C. in an oven for formation at room temperature. The formation conditions include the following conditions. The battery is charged with a 0.1 C constant current to 4.25V, then charged with the constant voltage to a current <0.05 C. After standing for 5 minutes, the battery is discharged with a 0.1 C constant current to 3.0V, and standed for 5 minutes.

After formation is completed, the monolithic batteries corresponding to the different Examples and Comparative Examples are tested at 45° C. and 10° C. for a first-time discharge capacity and a discharge capacity after 20 cycles with 0.1 C, and the test results are listed in Table 2.

TABLE 2

| Serial Number | 10° C. Discharge Capacity (mAh) | | 45° C. Discharge Capacity (mAh) | |
|---|---|---|---|---|
| | First Time | After 20 Cycles | First Time | After 20 Cycles |
| M1 | 52.5 | 54.5 | 63.5 | 63.8 |
| M2 | 53.2 | 53.4 | 62.3 | 62.4 |
| M3 | 55.8 | 55.5 | 62.8 | 62.7 |
| M4 | 54.3 | 54.6 | 63.2 | 63.3 |
| M5 | 54.4 | 54.7 | 63.4 | 63.8 |
| M6 | 53.2 | 53.6 | 64.2 | 64.3 |
| M7 | 53.5 | 54.0 | 63.6 | 63.5 |
| M8 | 52.7 | 52.9 | 62.2 | 62.7 |
| M9 | 54.6 | 54.8 | 63.7 | 63.2 |
| M10 | 52.8 | 53.1 | 64.1 | 64.3 |
| M11 | 53.4 | 53.3 | 62.5 | 62.8 |
| M12 | 55.1 | 55.4 | 62.8 | 63.3 |
| N1 | 28.5 | 20.0 | 48.1 | 34.2 |
| N2 | 34.5 | 34.0 | 61.5 | 61.9 |
| N3 | 29.1 | 25.3 | 44.4 | 31.4 |

Based on the data provided in Table 2, it can be seen in Examples 1-12, Comparative Example 1, and Comparative Example 3 that compared to the PEG film without the structural unit B and the PEG film containing the structural unit E, the PEG film containing the structural unit B exhibits a significantly improved discharge capacity in the first-time discharge capacity and the discharge capacity after 20 cycles at the low temperature of 10° C. and the high temperature of 45° C. It is thus indicated that an oxygen atom adjacent to olefinic bond in the structural unit B has a lone pair of electrons. Compared to saturated hydrocarbons, the structural unit B is thus more inclined to transfer electrons to double bonds to increase electron cloud density of the double bonds, so that the double bonds are more suitable for combining with Li+. In this way, the transmission capability of lithium ions is further improved. Based on Examples 1-12 and Comparative Example 2, it can be known that at the low temperature of 10° C., the first-time discharge capacity and the discharge capacity after 20 cycles of the PEO film containing the structural unit B are both significantly greater than that of the PEO film added with the lithium ion conductor powder, and at the high temperature of 45° C., performance of the first-time discharge capacity and the discharge capacity after 20 cycles of the PEO film containing the structural unit B is greater than that of the PEO film added with lithium ion conductor powder. It is thus indicated that the PEO film provided by the disclosure may be securely adhered to an anode and a cathode and may continuously contact with the anode and the cathode securely after being assembled into a battery, and detachment is thereby prevented. The battery thereby exhibits favorable cyclic stability.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A PEO film, wherein a molecular structure of the PEO film comprises a structural unit B, and the structural unit B is —CH=CH—O— or —$R_1$—CH=CH—O—, wherein $R_1$ is selected from a C1 to C10 linear alkyl group or a C2 to C10 linear alkenyl group, and wherein the molecular structure of the PEO film comprises a structural unit D, and the structural unit D is —$C_2H_3F$—O— or —$R_2$—$C_2H_3F$—O—, wherein $R_2$ is selected from a C1 to C10 linear alkyl group.

2. The PEO film according to claim 1, wherein the structural unit B is one of following structural formulas B1, B2, or B3:

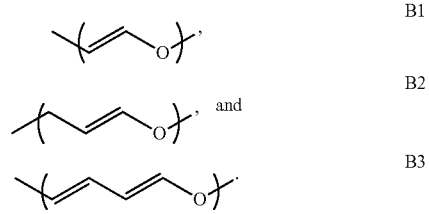

3. The PEO film according to claim 1, wherein the structural unit D is one of following structural formulas D1, D2, or D3:

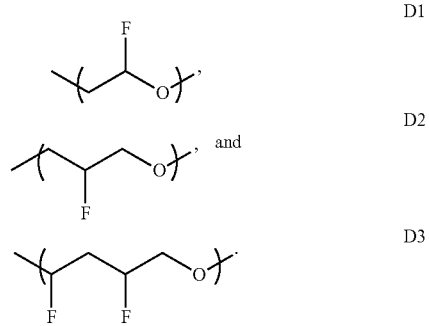

4. The PEO film according to claim 2, wherein the structural unit D is one of following structural formulas D1, D2, or D3:

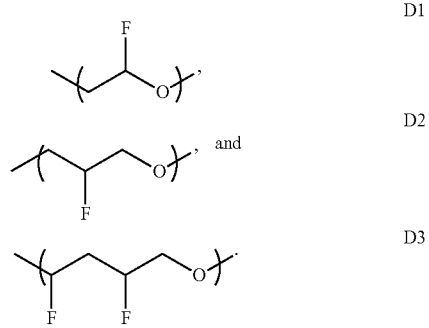

5. A solid-state battery, comprising an anode electrode sheet, a cathode electrode sheet, and the PEO film according to claim 1 between the anode electrode sheet and the cathode electrode sheet.

6. A solid-state battery, comprising an anode electrode sheet, a cathode electrode sheet, and the PEO film according to claim 1 obtained through a preparation method between the anode electrode sheet and the cathode electrode sheet, wherein the preparation method comprises the following steps:
performing a copolymerization reaction of an ethylene oxide monomer and an F-containing cyclic ether monomer to obtain a polymer precursor containing the structural unit D;
performing a F removal treatment on part of the structural unit D of the polymer precursor to form polymer glue containing the structural unit B, performing a film forming treatment on the polymer glue to obtain the PEO film.

7. A preparation method of a PEO film, wherein the preparation method comprises the following steps:
performing a copolymerization reaction of an ethylene oxide monomer and an F-containing cyclic ether monomer to obtain a polymer precursor containing a structural unit D, wherein the structural unit D is —$C_2H_3F$—O— or —$R_2$—$C_2H_3F$—O—, wherein $R_2$ is selected from a C1 to C10 linear alkyl group;
performing a F removal treatment on part of the structural unit D of the polymer precursor to form polymer glue containing a structural unit B, performing a film forming treatment on the polymer glue to obtain the PEO film, wherein the structural unit B is —CH=CH—O— or —$R_1$—CH=CH—O—, wherein $R_1$ is selected from a C1 to C10 linear alkyl group or a C2 to C10 linear alkenyl group.

8. The preparation method according to claim 7, wherein the ethylene oxide monomer and the F-containing cyclic ether monomer are evenly stirred in an aprotic solvent, and fluoride ions act as a catalyst for reaction to obtain the polymer precursor.

9. The preparation method according to claim 8, wherein the aprotic solvent comprises at least one of liquid ammonia, liquid chlorine, or ether, wherein the ether is aliphatic polyether having 4 to 15 carbon atoms.

10. The preparation method according to claim 7, wherein the F-containing cyclic ether monomer is selected from at least one of following structural monomers:

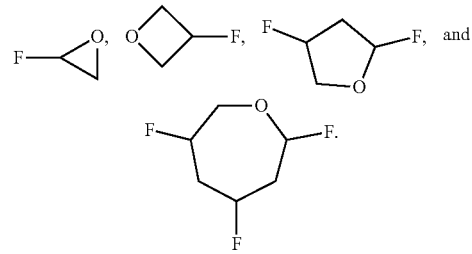

11. The preparation method according to claim 7, wherein a mass ratio of the ethylene oxide monomer to the F-containing cyclic ether monomer is 19 to 1:1.

* * * * *